July 21, 1964
P. S. FAY ETAL
3,141,796
ENERGY CONVERSION PROCESS
Filed Dec. 30, 1960
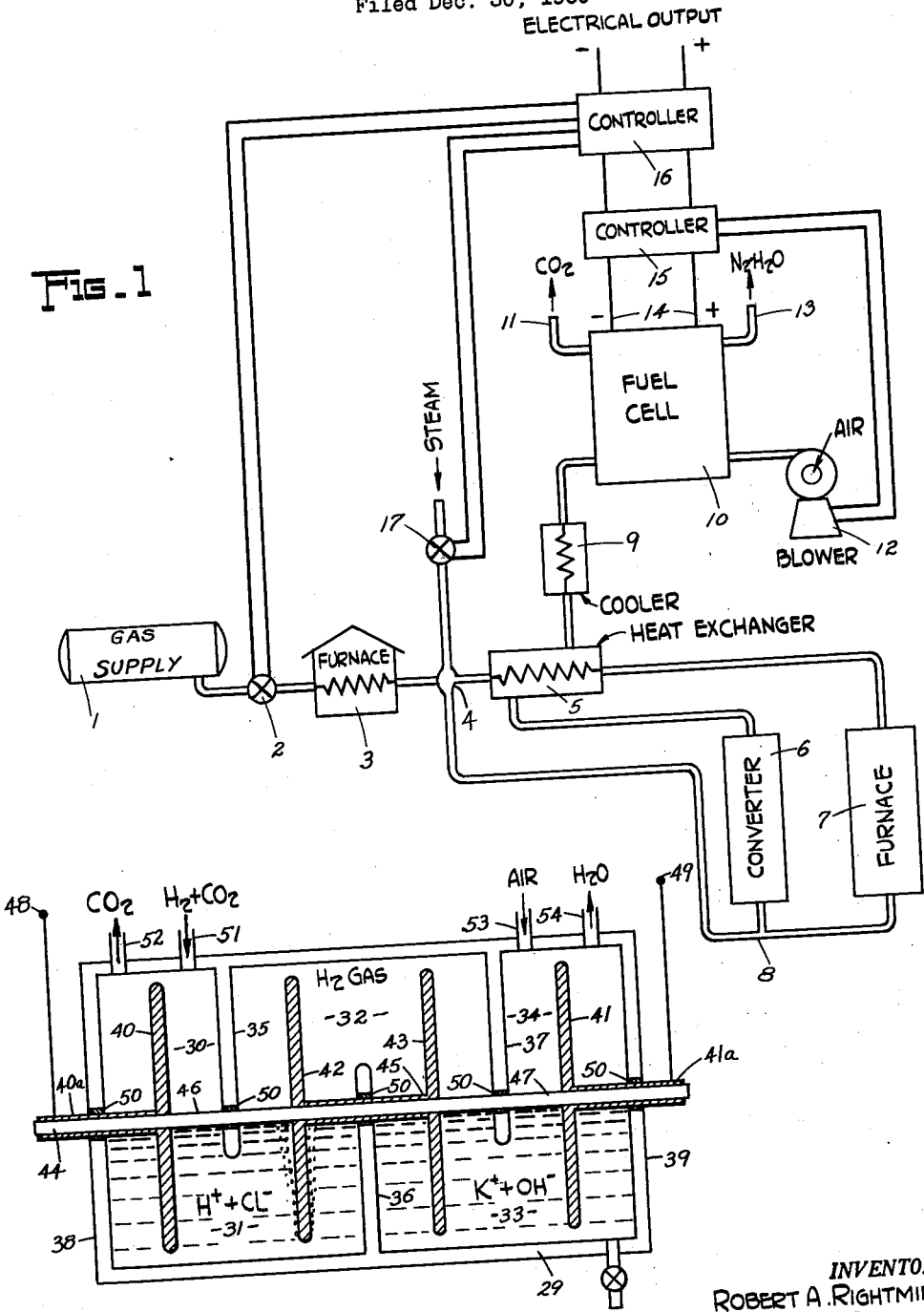
INVENTORS
ROBERT A. RIGHTMIRE
PHILIP S. FAY
BY Schramm, Kramer & Sturges
ATTORNEYS.

United States Patent Office 3,141,796
Patented July 21, 1964

3,141,796
ENERGY CONVERSION PROCESS
Philip S. Fay, Cleveland, and Robert A. Rightmire, Twinsburg, Ohio, assignors to The Standard Oil Company, Cleveland, Ohio, a corporation of Ohio
Filed Dec. 30, 1960, Ser. No. 79,901
1 Claim. (Cl. 136—86)

This invention relates, as indicated to an apparatus for converting an oxidized fuel into an electrochemical reactant and generating electrical energy by electrochemically reconstituting the oxidized fuel. More particularly this invention relates to an apparatus for chemically combining a carbonaceous reagent with an oxidized fuel to produce an admixture of a carbon oxide and an elemental fuel and for selectively oxidizing the elemental fuel in an environment which is inert to carbon oxides to produce electrical energy.

Modern central power plants, for example, generally utilize the energy contained in carbonaceous compound such as coal, petroleum hydrocarbons, or natural gas for the production of steam power or electrical power. Efforts are often made to secure as complete exothermic combustion of these carbonaceous compounds as possible. Nevertheless, the stack gases, or by-product gases often do contain substantial quantities of carbon monoxide. This carbon monoxide, the energy potential of which is frequently wasted, can be recovered in an energy conversion apparatus of the type hereinafter more particularly described. In like manner, carbon monoxide from any other source, e.g., the production of coke, may be utilized in a manner, such as hereinafter more fully described.

In accordance with this invention, a water gas generator is employed which utilizes exothermically produced carbon oxide materials, such as, carbon monoxide, from power plants, or coke ovens, to produce, endothermically by reaction with water, hydrogen in physical admixture with by-products of this chemical reaction. By the means hereinafter more particularly described, the fuel-containing material, e.g., water which is an example of an oxidized fuel may be chemically analyzed, and then subsequently electrochemically analyzed by the selective utilization of the fuel in electrochemical reaction apparatus for reaction with an antifuel to reconstitute the fuel-containing reaction product, or more specifically, an oxidized fuel, and to produce electrical energy, as hereinafter more particularly described.

Direct conversion of the chemical energy of a fuel into electrical energy is accomplished by causing chemical reactions to take place between reactive materials at the juncture between spaced electron conductors and an intermediately disposed ion-containing and conducting medium, or media, to form a continuous energy exchange system. The reactive materials are separately supplied to each juncture so that the charge exchange of the reaction takes place ionically through the ion-conductor forming an internal circuit and electronically through the electron conductor forming an external circuit. Thus, where the reactive materials are continuously supplied and an electrical load coupled to the external circuit it is possible to electrochemically convert the energy of chemical reaction directly into electrical energy in the external circuit.

By way of example, where the hydrogen is employed as one of the materials and oxygen as the other, the oxidation and reduction of each of these materials at the corresponding juncture between the electronic and ionic conductors generates electrical energy in the external circuit and produces water as a product of the reaction. When each of the materials is continuously supplied and consumed within such an apparatus, it may be likened, respectively, to a fuel, and to an antifuel, the former of which is selected to yield electrons in its chemical reaction and the latter of which is selected to accept electrons.

Normally, in any such apparatus, the fuel and the antifuel are supplied in a relatively stable condition and some means is required for activating their conversion from their normally stable reactive state to their reaction product state. It is believed that such conversion of the fuel and antifuel takes place by means of chemical adsorption to a chemisorbed state and desorption to their reaction product state at the corresponding junctures between the electron and ion conductors. Such conversion of the fuel and the antifuel is not practically self-motivating and is, therefore, preferably enhanced by the introduction of some means that will promote adsorption at each juncture and some ionic means in the ion-containing and conducting medium which will promote desorption at each juncture. The reaction products may be removed from the apparatus in any convenient manner and preferably as they are formed.

For the purpose of this description the apparatus for accomplishing the direct conversion of chemical energy into electrical energy will be identified as a fuel cell. The electron conductors will be identified as electrodes and more specifically as the anode and cathode, respectively, depending upon whether they are on the fuel or antifuel side of the cell. The fuel will be identified throughout as any substance which is oxidizable relative to the antifuel which will in turn be identified as any substance which is reducible relative to the fuel; where oxidation and reduction, respectively, contemplate the release and acceptance of electrons.

A medium which is capable of conducting an electrical charge associated with an atom or group of atoms, i.e., ions, will be referred to as an ion-containing and conducting medium. An ion-transfer medium, comprising one or more ion-containing medium, serves to isolate the electronic conductors from each other in the internal circuit. The junctures between the electrodes and the ion-transfer medium will be identified throughout as interfaces. The activating means for promoting the conversion of the fuel and antifuel from their reactant state through the chemisorbed state to the reaction product state will be more specifically identified in conjunction with their functional coaction in the cell as an adsorber and a desorber. This overall reaction will be referred to as an electrochemical reaction.

The term "analyze" as used herein will be understood in its broader sense of taking apart a composite substance for the purpose of utilizing a part thereof, and in no way implies a need to measure the parts. An example of chemical analysis which will be referred to frequently herein is the "water gas" reaction by which hydrogen fuel is chemically analyzed from water in the presence of carbon monoxide, carbon, or a low molecular weight hydrocarbon, e.g., methane, ethane, propane, butane, etc.

While the energy conversion apparatus of the present invention has utility in connection with a central power plant as indicated above, it will be understood that the principles of this invention may also be applied to industrial processes which utilize natural gas or heavier hydrocarbons as feed material which produce a mixture of hydrogen, carbon monoxide and/or carbon dioxide, as well as other industrial operations such as coke production. Operating conditions for the industrial processes for the most efficient conversion of various hydrocarbon feeds are well known and, in most cases, where carbon monoxide is not particularly desirable, as in the present case, subsequent catalytic reaction with additional steam can produce additional hydrogen. Thus, not only coal but also petroleum oil, fuel oil, natural gas, and various gaseous hydrocarbons, e.g., propane, may be used as the primary power source.

In the annexed drawings:

FIG. 1 is a schematic flow diagram of an energy conversion apparatus in accordance with the present invention.

FIG. 2 is a diagrammatical illustration of a fuel cell employing rotating electrodes which is useful in the apparatus shown in FIG. 1.

Briefly stated, then, the present invention is an apparatus for energy conversion particularly of the central power plant type, which includes means for chemically analyzing a material having a fuel in chemical combination therewith to produce a mixture of fuel residual products. Since the physical admixture is not wholly utilizable as the fuel, means are provided for physically separating the mixture including means directly associated therewith for electrochemically reacting the fuel with an antifuel to produce electrical energy. The apparatus in which this electrochemical reaction occurs includes an ion-transfer medium which may include elements chemically reactive with the residual products of the physical admixture. Means are also provided for isolating and by-passing the residual products to prevent chemical interaction within the ion-transfer medium. A principal advantage of the apparatus of the present invention is in the ability to utilize physical admixtures, such as water-gas, for the production of electrical energy in a low temperature energy conversion reaction apparatus.

Referring more particularly to FIG. 1, there is shown an apparatus utilizing the water-gas reaction and wherein carbonaceous gas such as, a gas rich in carbon monoxide, from gas supply 1 passes through the feed control valve 2 and into a preheat furnace 3 where the temperature of the gas is raised to approximately 600° F. The preheated gas emerging from the preheat furnace is injected with high temperature steam at 4 and enters the heat exchanger 5 where the steam-hydrocarbon mixture picks up additional heat from the product gases of the carbon monoxide catalytic converter 6. The gas mixture from the heat exchanger 5 goes to the water-gas conversion tube furnace 7 where the gas reacts at a temperature of about 1500° F. to form a mixture of hydrogen and carbon dioxide and unreacted carbon monoxide.

Although this mixture containing carbon monoxide may be utilized in the method of this invention as the fuel feed to a fuel cell for the production of electrical power, additional energy potential may be derived by the further converison of the carbon monoxide to carbon dioxide with steam in the presence of a catalyst. Accordingly, the carbon monoxide, carbon dioxide, and hydrogen product mixture in the water-gas conversion tube furnace 7 is injected with high temperature steam at 8 which cools the gaseous mixture to a temperature of approximately 700° F. The mixture of steam, carbon monoxide, carbon dioxide and hydrogen then goes to the catalytic carbon monoxide converter 6 where essentially all of the carbon monoxide is converted to carbon dioxide with the production of an equimolar increase in hydrogen over the catalytic mixture of iron and chromium oxides at a temperature of 700° F.

The small residual amount of carbon monoxide in these product gases may be converted by a second stage processing step over an iron oxide-chromium oxide catalyst, but, in most cases it would probably not be economical to install this additional catalytic stage.

The gaseous physical admixture from the catalytic carbon monoxide converter 6 consisting primarily of carbon dioxide and hydrogen goes to the heat exchanger 5 where it is reduced in temperature, and by heat exchange raises the temperature of the steam-hydrocarbon feed stream to the water-gas conversion tube furnace 7, and then goes to the cooler 9 where it is further reduced in temperature to 100 °C. before entering the fuel cell 10.

In general, the carbon dioxide portion of the feed mixture from the cooler 9 passes unchanged through the fuel cell and is exhausted to the atmosphere at 11. On the antifuel side of the fuel cell, air is charged to the fuel cell by means of a blower 12, and the products, water and nitrogen, are exhausted to the atmosphere at 13. The electrical output of the fuel cell 14 passes through a control 15 which regulates the rate of air feed to the fuel cell, and other controllers 16 which regulate the rate of gas feed at 2 and of steam injection at 17.

FIG. 2 shows a preferred form of fuel cell for use in the apparatus of the present invention. We have found that the presence of carbon dioxide in the gaseous material fed to the fuel side of the fuel cell ordinarily causes carbonate accumulation in the ion-containing and conducting medium and the rapid deterioration of fuel cell efficiency. Accordingly, it has been found necessary to provide means for selectively analyzing the mixture in an environment which is inert or otherwise impermeable to the residual products.

To accomplish this, hydrogen is first put into solution in ionic form in the presence of a medium which is not reactive with carbon dioxide, such as an aqueous hydrochloric acid solution. A satisfactory aqueous solution is 6 normal hydrochloric acid. Under the influence of high concentration of ions in the acidic medium, the hydrogen ions are moved to a barrier which prevents the passage of carbon dioxide, and permits the passage of hydrogen either diffusively or electrochemically, or a combination of both, into a basic medium where electrochemical interaction between the fuel and an antifuel is permitted to take place with a resultant production of the electrical output of the cell in a manner to be hereinafter more particularly described.

In FIG. 2 there is provided a water-tight container 29 made of any suitable non-conducting material; e.g., glass, hard rubber, nylon, polyethylene, fiber glass reinforced polyester resins, etc. The interior of the container 29 is divided into a plurality of compartments 30, 31, 32, 33 and 34 by means of wall segments 35 and 37, depending from the topmost portion of the container 29, and wall segment 36 extending from the bottom of the container 29. The wall segments partially extending across the cell body 29 in combination with the ion-containing and conducting media carried in compartments 31 and 33 isolate compartments 30, 32 and 34 from each other, and the wall section 36 extending above the level of the ion-containing and conducting media in compartments 31 and 33 serves to isolate the respective media from each other. An axle 44 is suitably bearinged for rotation in end walls 38 and 39 of the container 29, the depending wall segments 35 and 37, and upperly extending wall segment 36. Mounted for rotation on the axle 44 is an electrically conductive electrode 40, e.g., a stainless steel disc, which is adapted to be exposed to a fuel such as, for example, water-gas, or other mixtures of various gaseous fuels, etc. The electrode 40 is in contact with both the chambers 30 and 31, but insulated from electrical contact with all other electrodes in the apparatus, and the walls of the container. Electrode 40 is provided with an axle sleeve 40a of electrically conducting material for connection to the external circuit load not shown. Another electrically conducting electrode 41 is also mounted on the axle 44 for rotation, and is in contact with chambers 41 and 33. Electrode 41, which may be made of any suitable electrically conducting material, e.g., a stainless steel disc, is adapted to be in contact with an anti-fuel in chamber 41 and is maintained out of electrical contact with all of the other electrodes in the system, and in the side walls of the container. Electrode 41 has also an axle sleeve 41a similar in purpose and operation to sleeve 40a.

There is also provided a pair of auxiliary electrodes 42 and 43 which may also be stainless steel discs, likewise mounted on the axle 44, the electrodes 42 and 43 being in electrical contact with each other as by a conducting sleeve portion 45 surrounding the axle 44. Axle portions 46 and 47 are free of electrically conducting material. It will be found convenient to make the axle 44 entirely of a non-conducting material such as nylon and utilize the metallic sleeves suitably keyed to axle 44 for rotation therewith to provide for electrical conductivity where necessary.

Auxiliary electrodes 43 and 42 are disposed on opposite sides of the upstanding barrier 36, and both in communication with chamber 32. Auxiliary electrode 42, however, is in contact with the ion conducting and containing medium disposed in chamber 31, and auxiliary electrode 43 is in contact with the ion-containing and conducting medium disposed in chamber 33. Suitable bearing means 50, such as nylon bearing insert, are provided in the end walls 38 and 39, the depending wall portions 35 and 37, and the upstanding wall segment 36. All such bearings are in axial alignment and adapted to receive the axle 44 for rotation of the electrodes 40, 41, 42 and 43. In a preferred embodiment electrodes 40, 41, 42 and 43 are conveniently steel discs having platinum black deposited on the surfaces thereof.

The fuel chamber 30 is also provided with an inlet 51 through which the gaseous fuel admixture, such as the products of the water-gas reaction may be introduced. A chamber 30 is also provided with an exhaust vent 52 through which are exhausted the products of combustion and the physically analyzed carbon dioxide.

On the opposite side of the cell, a relatively reducible material is supplied as an antifuel, and in the particular case illustrated in FIG. 2, air containing free oxygen, or any other oxygen-containing gas, is conveniently employed as the antifuel. Accordingly, the chamber 34 is provided with an air inlet duct 53. The product of the reaction of reduction occurring primarily at the electrode 43 is water. If the temperature of operation of the cell is sufficiently high to cause vaporization of the water, a vent 54 may be supplied for purpose of removal of exhaust water vapor. Otherwise, a valved conduit 54 in the bottom of the container may be provided for this purpose. The reduction of the antifuel is favored by a basic ion-containing and conducting medium, as distinguished from an acidic medium. One of the reasons for this preference is the minimization of the formation of hydrogen peroxide at the antifuel electrode-ion conducting medium interface.

In operation, hydrogen from the feed mixture becomes readily adsorbed on the surface of the rotating electrode 40 and is carried down into the acidic ion-containing and conducting medium having, for example, hydrogen and chloride ions in aqueous solution. When the terminals 48 and 49 are connected across an external load, an oxidation reaction occurs at the interface between the submerged portion of the rotating electrode 40 having the hydrogen adsorbed thereon and the ion-containing and conducting medium. Since the carbon dioxide is fully oxidized, there is no oxidation reaction occurring with this portion of the feed mixture. With the hydrogen, however, the result of this oxidation reaction is a yielding up of hydrogen ions to the solution and electrons to the external circuit. Carbon dioxide is not soluble in the acidic medium and is exhausted. The concentration of the hydrogen ion therefore increases in the vicinity of electrode 40 causing a drift or a migration thereof toward auxiliary electrode 42.

The presence of available electrons at the metal surface enables the hydrogen ions coming in contact with the auxiliary electrode 42 to accept the neutralizing electron, pass from the atomic to the molecular hydrogen state, and ultimately be carried out of the acidic ion-containing and conducting medium 31 into the hydrogen chamber 32 where hydrogen gas is released from the surface of the electrode again because of concentration effect thereby increasing the concentration within chamber 32. Auxiliary electrode 43 also in contact with the hydrogen gas accepts the hydrogen in an absorbed state and carries it down into the basic ion-containing and conducting medium 33, such as potassium hydroxide in aqueous solution (6 normal), where it undergoes electrochemical reaction with hydroxyl ions derived from the antifuel and carried in the ion-containing and conducting medium in chamber 33. The product of this reaction is water, and as indicated above, may either be exhausted in a vapor state, or periodically drained from the bottom of the container.

The antifuel or oxygen-containing gas is continuously fed to the exposed surface of antifuel electrode 41, becoming adsorbed thereon and carried down into the basic ion-containing and conducting medium in chamber 33. By a process of desorption from the chemisorbed state, hydroxyl ions are derived from the antifuel by reaction with water, and electron provided from the external circuit and carried into solution as the hydroxyl ion. As the concentration of hydroxyl ions builds in the vicinity of the rotating electrode 41, the movement of the hydroxyl ions is in the direction of the electrode 43. The hydrogen re-ionizing at the interface between the ion-containing and conducting medium carried in vessel 33 releases an electron to the auxiliary electrode 43 which is conducted by means of the conducting sleeve 45 to the auxiliary electrode 42 to replace the electron accepted by the positive ion in chamber 31.

The auxiliary electrodes 42 and 43, in combination with the hydrogen gas chamber 32 provide, therefore, a shunting structure which coacts with the two chemically incompatible ion-containing and conducting media disposed in chamber 31 and 33 respectively, to couple the hydrogen ions derived from the chemically and physically analyzed fuel source and the hydroxyl ions derived from the antifuel for electrochemical reaction at the interface between the auxiliary electrode 43 and the basic ion-containing and conducting medium disposed in chamber 33, i.e., the medium including the antifuel derived ions. Since the antifuel derived ions do not become volatile upon neutralization as are the neutralized hydrogen ions derived from the fuel, the electrochemical reaction takes place in the medium containing the ions which do not volatilize upon neutralization of their charge. The upstanding wall 36, serves to prevent the chemically incompatible ion-containing and conducting media from comingling and interacting. Direct utilization of hydrogen is obtained. Carbon dioxide which is in physical admixture with the fuel, hydrogen, is harmlessly exposed to a medium with which it is non-reactive, i.e., an acidic medium. The oxygen or antifuel electrode reaction is reversible, and the reactions occurring at the other electrodes in the cell are likewise reversible. Accordingly, the cell is highly efficient.

The same results may be obtained by the employment of fuel cells embodying shunting means in the internal circuit of a different nature whereby an ion, derived either from the fuel or the antifuel, is deprived of its charge and transported in its elemental state to the opposite side of the barrier, where it is available for electrochemical reaction with the ion which forms the other portion of the electrochemical couple. For example, a palladium metal foil may be employed as an ion impermeable barrier means to maintain the chemically incompatible ion-containing and conducting mediums disposed in chambers 31 and 33 out of physical contact and therefore unable to react chemically. Palladium has the property of transferring hydrogen in the elemental state therethrough. Hence, in FIG. 2, the auxiliary electrodes 42 and 43 and the barrier 36 could be replaced by a palladium barrier. Also because of its metallic nature, palladium is able to electronically conduct electrons from one side of the cell to the other to reconstitute the hydrogen permeating the palladium foil barrier as an ion in solution. At the same time, palladium is inactive to aqueous solutions of acids and bases.

There has thus been provided in an apparatus for energy conversion including means for chemically analyzing a material having a fuel and chemical combination therewith into a physical mixture of fuel and residual products. The fuel-containing material may be water from which fuel is chemically derived by chemical analysis by reaction with carbon monoxide in the vapor state. Alternatively, a low molecular weight hydrocarbon such as methane or ethane may be reacted with water in the vapor state in the presence of a catalyst. The resulting mixture of fuel and residual products is then further analyzed by electrochemically reacting the fuel portion of the admixture with the antifuel, e.g., air, in an ion transfer-medium which is not chemically reactive with the residual products, e.g., carbon dioxide. These residual products are exhausted from the cell. There results, therefore, a very economical arrangement for recovery of electrical energy by combining a power plant with a low temperature electrochemical reaction apparatus through the medium of a chemical analytical device.

Other modes of applying the principle of this invention may be employed instead of those specifically set forth above, changes being made as regards the details herein disclosed provided the elements set forth in the following claim, or the equivalent of such be employed.

It is, therefore, particularly pointed out and distinctly claimed as the invention:

The method for chemically converting a water gas reaction susceptible gaseous material including carbon monoxide into a mixture of an oxidizable fuel, carbon dioxide, and residual gases and said fuel into electrical energy by its selective reaction with a reducible antifuel in a fuel cell including an external circuit comprising:

(a) reacting said carbon monoxide containing gaseous material with water in a water gas reaction to produce a mixture of gases including carbon dioxide and hydrogen;

(b) supplying the mixture in a confined space for contacting the exposed surface of a rotatable electron conductor partially submerged in an aqueous acidic ion-containing and conducting medium;

(c) rotating said electron conducting surface through said aqueous medium to selectively desorb hydrogen ions from said surface to provide an increased hydrogen ion concentration in said medium;

(d) supplying a free oxygen-containing gaseous antifuel to a separate confined space to the exposed surface of a second rotatable electron conductor partially submerged in an aqueous basic ion-containing and conducting medium;

(e) rotating said electron conducting surface through said basic medium to selectively desorb hydroxyl ions from said second surface to provide an increased hydroxyl ion concentration in said basic medium;

(f) chemically isolating and electronically coupling the ions in the acidic medium with the ions in the basic medium by introducing a physical barrier between the mediums and by bridging said barrier with an electron conductor having surfaces exposed respectively to the ions in the acidic and basic mediums;

(g) discharging said hydrogen ions in said acidic medium at the exposed electron conducting surface in said acidic medium to yield gaseous hydrogen;

(h) collecting said gaseous hydrogen in a third separate confined space and exposing it to the electron conducting surface in said basic medium for adsorption thereon;

(i) electronically transferring the charge through the electron conducting bridge;

(j) and electrochemically reacting said adsorbed hydrogen with said hydroxyl ions in said basic medium to produce electrical energy in said external circuit, and (k) exhausting carbon dioxide containing gases from the confined space to which the mixture including carbon dioxide and hydrogen was initially supplied.

References Cited in the file of this patent
UNITED STATES PATENTS

| | | |
|---|---|---|
| 390,676 | Humphreys | Oct. 9, 1888 |
| 411,426 | Dahl | Sept. 24, 1889 |
| 2,565,395 | Scharmann | Aug. 21, 1951 |
| 2,901,522 | Bopp | Aug. 25, 1959 |